United States Patent
Chang et al.

(10) Patent No.: US 9,358,728 B1
(45) Date of Patent: Jun. 7, 2016

(54) 3D PRINTER

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Jui-Feng Chang, New Taipei (TW); Sea-Mang Ying, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 50 days.

(21) Appl. No.: 14/574,623

(22) Filed: Dec. 18, 2014

(30) Foreign Application Priority Data

Nov. 13, 2014 (CN) .......................... 2014 1 0635172

(51) Int. Cl.
*B29C 67/00* (2006.01)
*B33Y 30/00* (2015.01)

(52) U.S. Cl.
CPC ............. *B29C 67/0085* (2013.01); *B33Y 30/00* (2014.12)

(58) Field of Classification Search
CPC .......................... B29C 57/0085; B33Y 30/00
See application file for complete search history.

(56) References Cited

U.S. PATENT DOCUMENTS

| 6,776,602 | B2 * | 8/2004 | Swanson | ................. B29C 41/36 206/204 |
| 8,926,484 | B1 * | 1/2015 | Comb | ................. B29C 67/0085 425/162 |
| 2010/0096485 | A1 | 4/2010 | Taatjes et al. | |
| 2012/0164256 | A1 * | 6/2012 | Swanson | ............. B29C 67/0055 425/162 |
| 2013/0333798 | A1 | 12/2013 | Bosveld et al. | |
| 2015/0037445 | A1 * | 2/2015 | Murphy | .............. B29C 67/0088 425/131.1 |
| 2015/0137401 | A1 * | 5/2015 | Comb | ................. B29C 67/0085 264/39 |
| 2016/0067920 | A1 * | 3/2016 | Fontaine | ............. B29C 67/0059 264/255 |

OTHER PUBLICATIONS

Search Report dated Apr. 29, 2015 of the corresponding European patent application.

* cited by examiner

*Primary Examiner* — Ryan Ochylski
(74) *Attorney, Agent, or Firm* — Chun-Ming Shih; HDLS IPR Services

(57) ABSTRACT

A 3D printer (1, 1a) includes a material rack (20, 20a). The material rack (20, 20a) includes a positioning plate (21) and a plurality of partition members (22). The partition members (22) are fixed to a door plate (12, 12a) and disposed in an inner area (120). The inner area (120) includes a plurality of material receiving compartments (121). A material tube (2) includes a pair of wings (3). The partition members (22) include positioning recesses (220) correspondingly. The material tube (2) is positioned by disposing the wings (3) on the positioning recesses (220) in a spanning manner. The material tube (2) is driven by a printing module (40, 40a) to move out of the material receiving compartment (121) and be positioned on the printing module (40, 40a).

12 Claims, 11 Drawing Sheets

3D PRINTER

BACKGROUND

1. Technical Field

The technical field relates to a quick shaping machine and, in particular, a 3D printer.

2. Related Art 3D printing relates to a quick shaping technique, called "additive manufacturing (AM)" or "layer manufacturing". According to a digital model file, 3D printing uses moldable materials, such as metallic powders or plastic, to build an object layer by layer based on parameters of the model file, thereby manufacturing a three dimensional solid model in any shape.

There are various methods to realize 3D printing using different technologies. One way is to squeeze materials out of the material tube and deposit the materials layer by layer to form a designed object. However, most of the 3D printing methods nowadays mainly employ one single material tube (material) to form the designed object. Some of the 3D printing methods have different materials or different colored materials stored in respective material tubes. When the material in the material tube are used up, or the material tube needs to be changed to another one, a user has to reach his/her hand into the printer to replace the material tube, so as to accomplish the forming of each part of the object.

However, replacing the material tube manually is extremely inconvenient during the 3D printing process. Besides, the user can be hit and hurt by the printer during the replacement process. On the other hand, the printer may be damaged by impact.

In view of the foregoing, the inventor made various studies to improve the above-mentioned problems to realize the improvements, on the basis of which the disclosed example is accomplished.

BRIEF SUMMARY

The disclosure is directed to a 3D printer which enables automatic replacement of a material tube, prevents the printer from being damaged by impact, and enhancing safety during usage.

According to one embodiment of the disclosure, the 3D printer includes a machine body, a door sheet, a material rack, at least one material tube, a driving module, and a printing module. The door sheet is movably connected to the machine body. The material rack is fixed to the door sheet and disposed in an inner area toward the inside of the machine body. The material rack includes a positioning plate and a plurality of partition members. The partition members divide the inner area into a plurality of material receiving compartments. The material tube includes a pair of wings, and each of the partition members includes a positioning recess correspondingly. The material tube is positioned in the material receiving compartment by disposing of the pair of the wings on the positioning recesses of two adjacent partition members in a spanning manner. The driving module is disposed in the machine body. The printing module is disposed in the machine body and driven by the driving module to move. The material tube is driven by the printing module to move out of the material receiving compartment and be positioned on the printing module.

Compared to the conventional techniques, the 3D printer of the disclosed example includes a material rack which is provided with a plurality of material tubes and is disposed on an inner side of the door sheet. The printing module is driven by the driving module to move to the material rack, and the material tube is driven by the printing module to move out of the material receiving compartment and be positioned on the printing module. Finally, the driving module drives the printing module to perform a printing operation. Accordingly, the disclosed example obviates the necessity of manually replacing the material tube, achieves automatic replacement of the material tube, avoids damage to the printer, and enhance the safety during usage.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following, detailed descriptions along with accompanied drawings are given to better explain the features and technical contents of the disclosed example. However, the following descriptions and the accompanied drawings are for reference and illustration only, and are not intended to limit the scope of the disclosed example.

Figure 1:
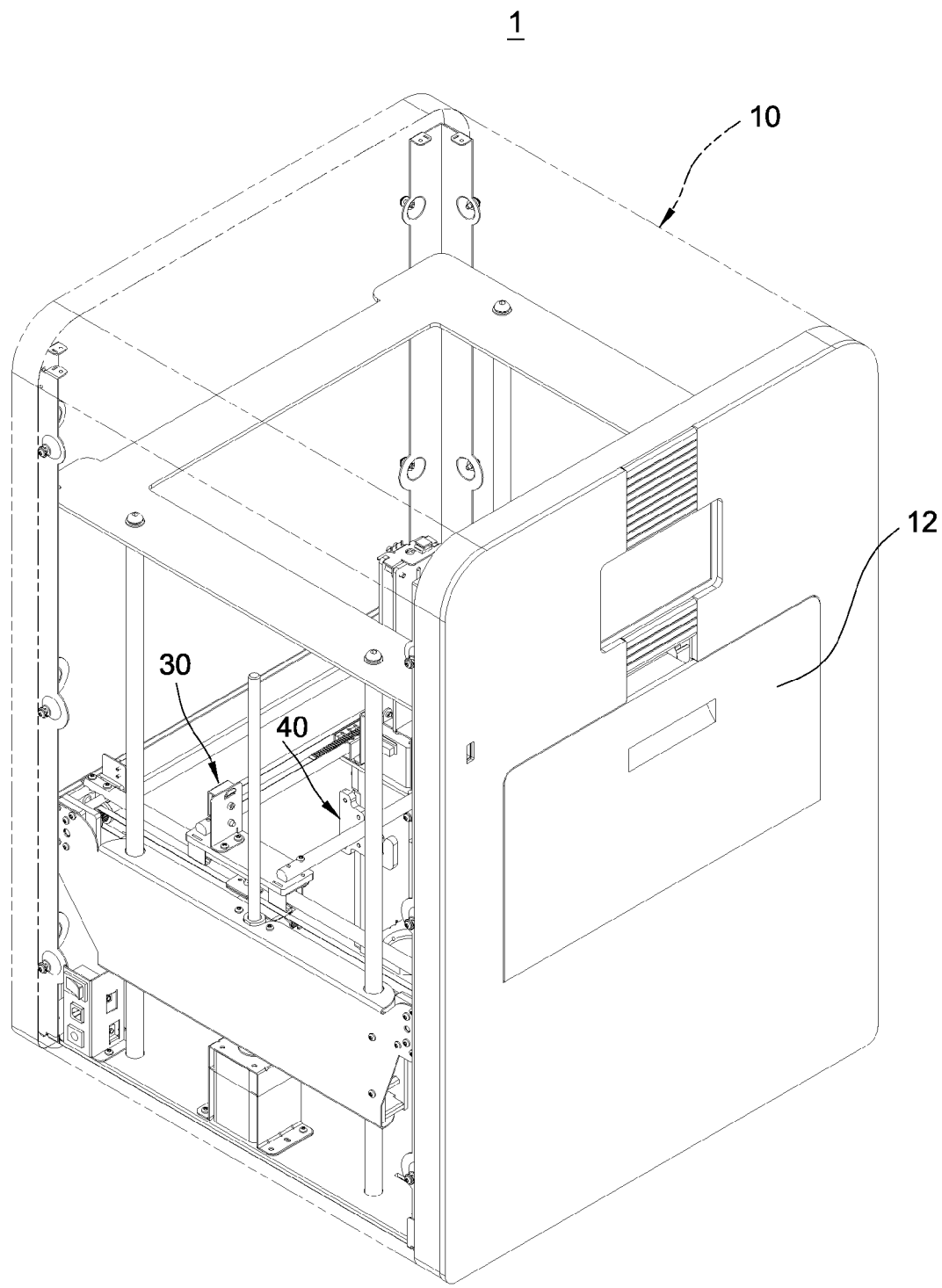
FIG. 1 is a front perspective view of a 3D printer of the disclosed example.
Figure 2:
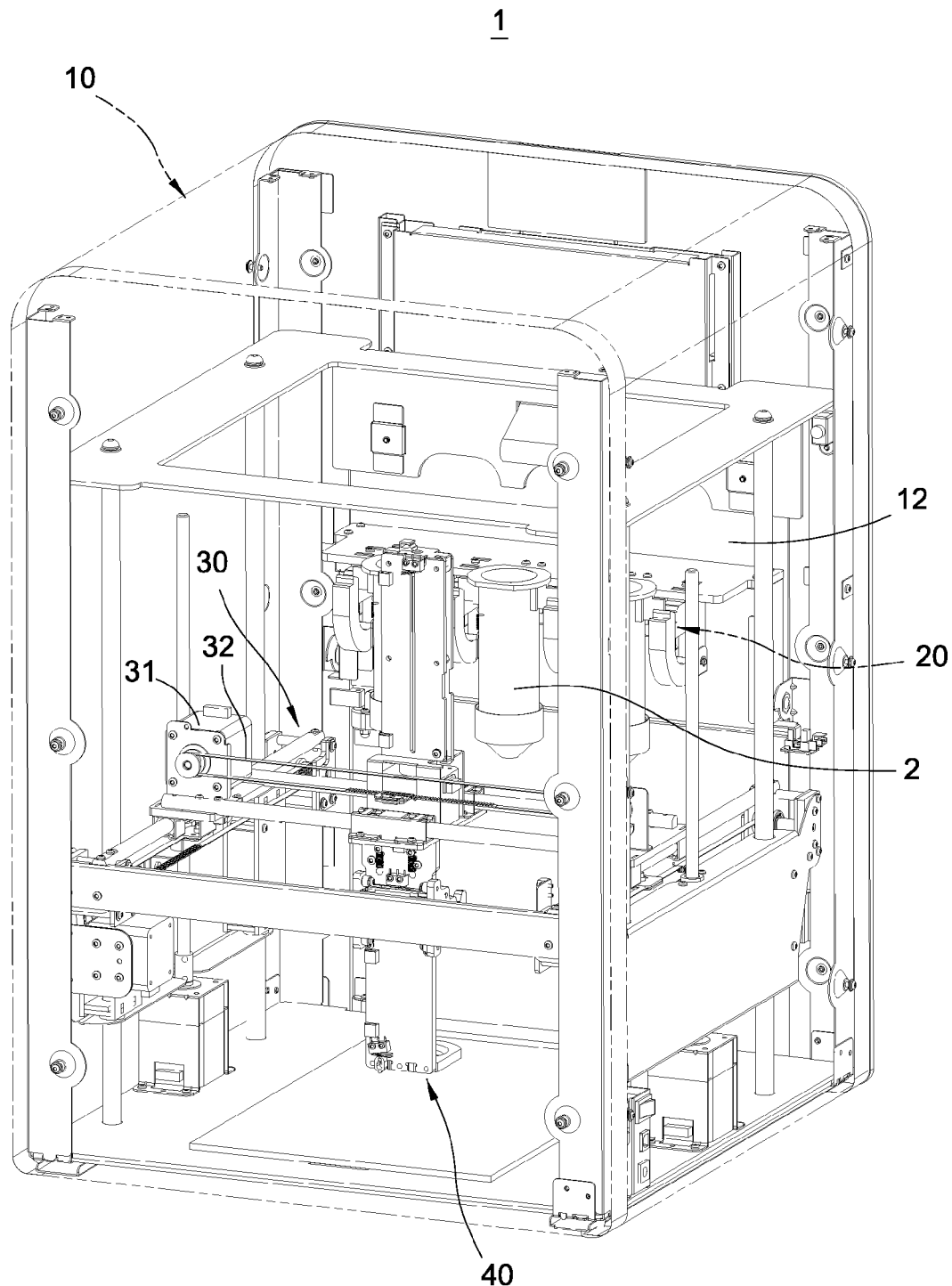
FIG. 2 is a rear perspective view of the 3D printer of the disclosed example.
Figure 3:
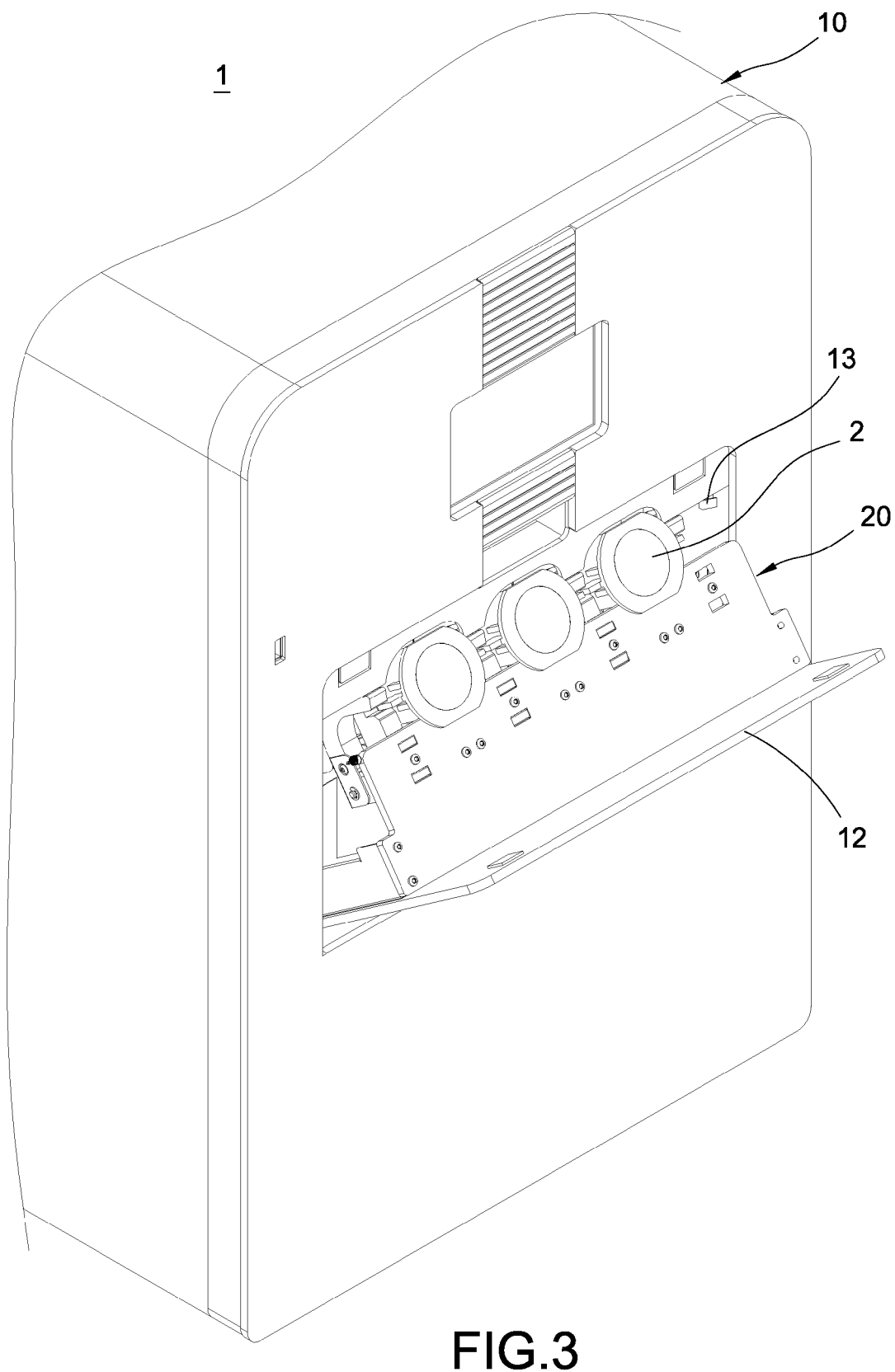
FIG. 3 is a perspective appearance view thereof showing a state in which a door sheet is opened.

Please refer to FIGS. 1 to 3 which are a front perspective view of a 3D printer of the disclosed example, a rear perspective view thereof, and a perspective appearance view showing a state in which a door sheet is opened, respectively. The disclosed example provides a 3D printer 1, comprising a machine body 10, a door sheet 12, a material rack 20, at least one material tube 2, a driving module 30, and a printing module 40. The material rack 20, the driving module 30, and the printing module 40 are all disposed inside the machine body 10. The printing module 40 is driven by the driving module 30 to move three-dimensionally in the machine body 10.

The door sheet 12 is movably connected to the machine body 10. The driving module 30 is disposed inside the machine body 10. The driving module 30 includes driving elements such as a motor 31 and a belt 32.

Referring to FIG. 3, the material rack 20 is fixed on the door sheet 12 and is disposed in an inner area 120 toward the inside of the machine body 10. According to the present embodiment, the door sheet 12 opens and closes in the up-down direction with respect to the machine body 10, and the door sheet 12 is opened in an inclination angle with respect to the machine body 10. It should be noted that, the machine body 10 further includes a first sensor 13, and the first sensor 13 is actuated by closing the door sheet 12 to cover the machine body 10. The disclosed example determines whether the door sheet 12 is in the open state based on the actuation of the first sensor 13.

Figure 4:
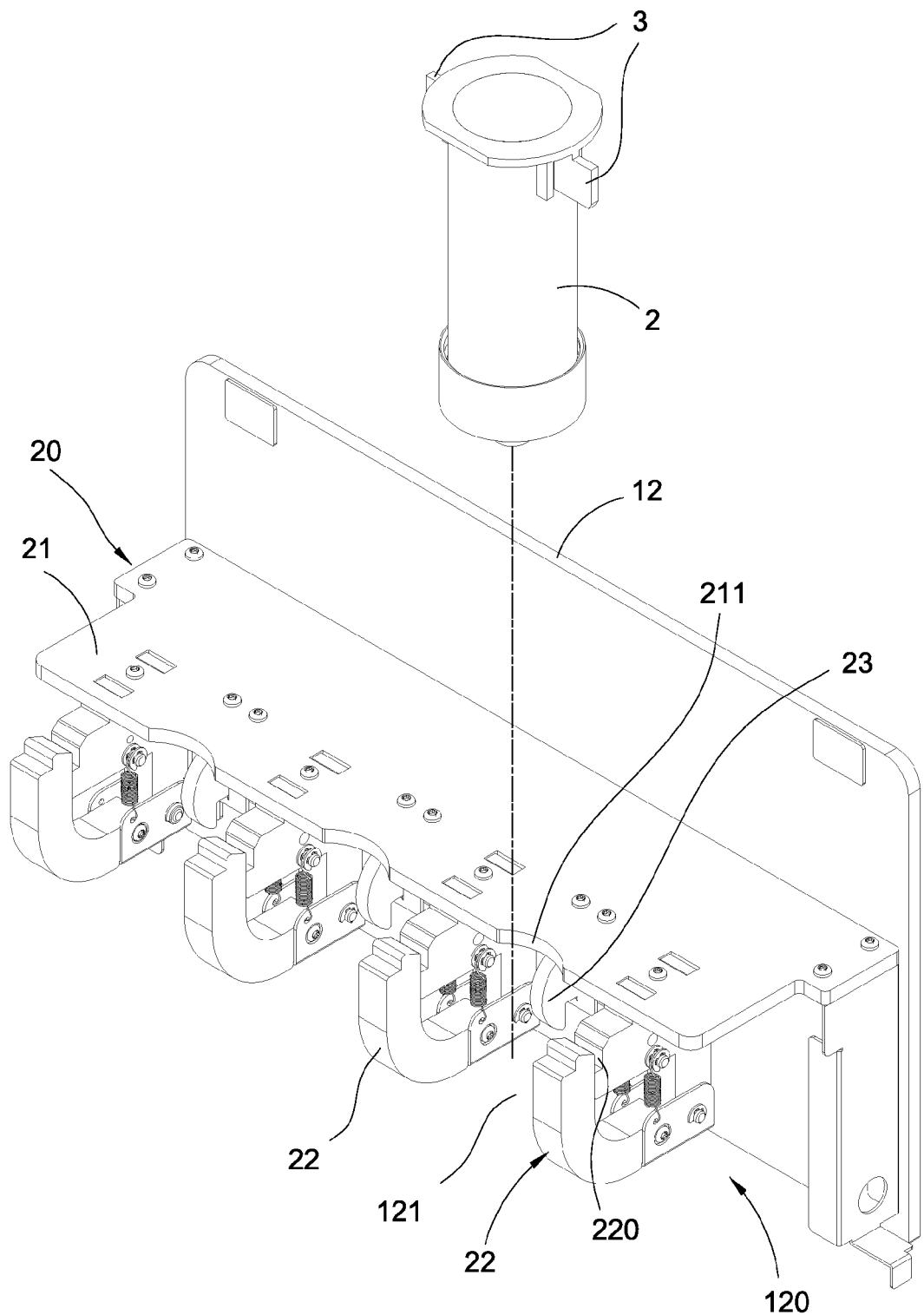
FIG. 4 is a perspective appearance view thereof showing a state in which a material rack is fixed to the door sheet.
Figure 5:
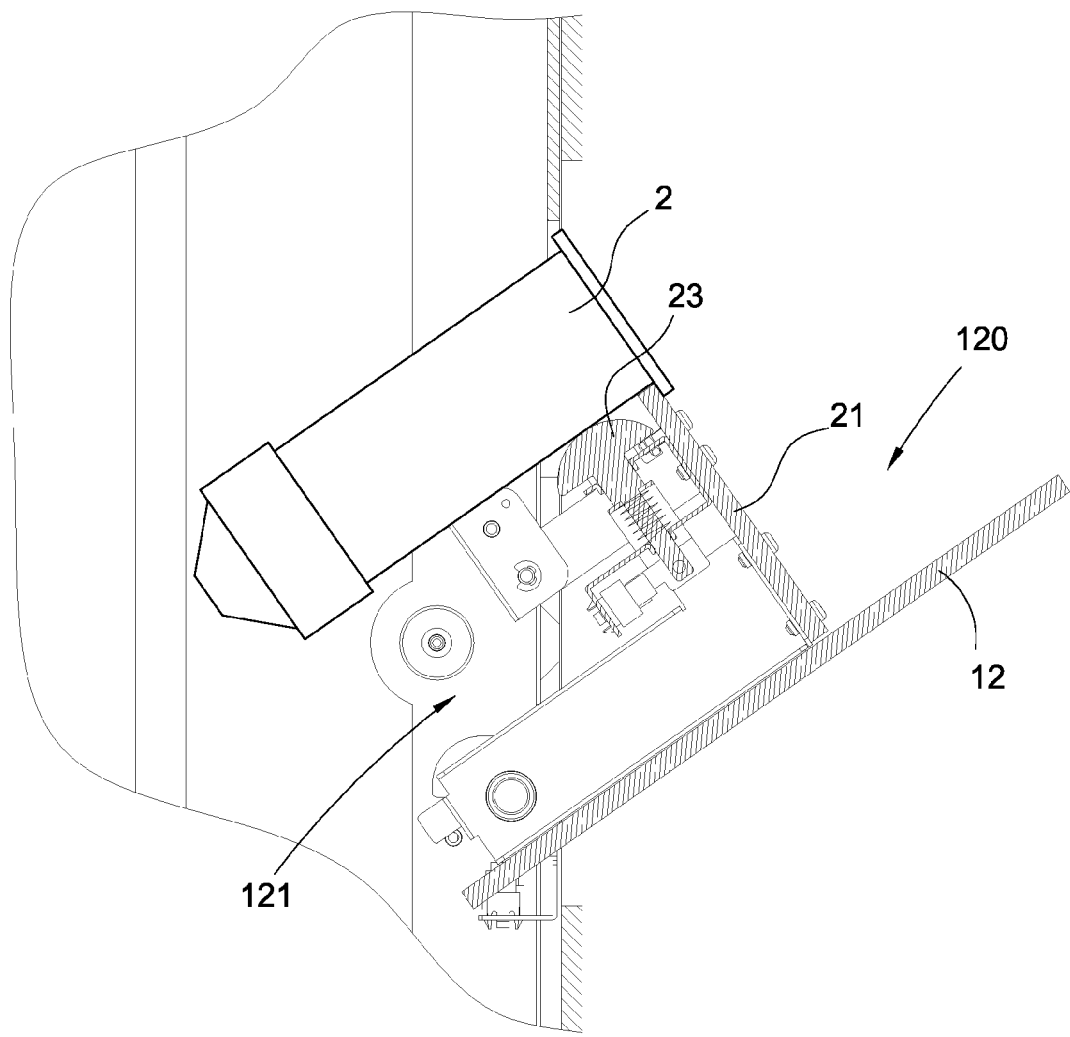
FIG. 5 is a cross-sectional view thereof showing a state in which the material rack is fixed to the door sheet.

Please refer to FIG. 4 and FIG. 5 which are a perspective appearance view and a cross-sectional view of the disclosed example, respectively, showing a state in which a material rack is fixed to the door sheet. According to the present embodiment, the material rack 20 includes a positioning plate 21 and a plurality of partition members 22. The partition members 22 divide the inner area 120 into a plurality of material receiving compartments 121. Each of the material receiving compartments 121 includes a second sensor 23 pressable by the material tube 2. By using the second sensor 23, the material rack 20 determines whether the material tube 2 is disposed in each of the material receiving compartments 121.

According to one embodiment of the disclosed example, the positioning plate 21 is disposed perpendicularly on the door sheet 12. Moreover, the partition members 22 are arranged equidistantly and parallelly on one side of the positioning plate 21, thereby dividing the inner area 120 into a plurality of the material receiving compartments 121 for disposing a plurality of the material tubes 2 therein. During practical use, the length of the positioning plate 21 and the number of the material receiving compartments 121 are not limited by the disclosed example and can be changed as required.

Referring to FIG. 4, the material tube 2 includes a pair of wings 3. Each of the partition members 22 includes a positioning recess 220 correspondingly. The material tube 2 is positioned in the material receiving compartment 121 by disposing of the pair of the wings 3 in a spanning manner on the positioning recesses 220 of two adjacent partition members 22. Furthermore, the positioning plate 21 includes a positioning portion 211, and a peripheral surface of the material tube 2 is in contact against the positioning portion 211. It is preferable that the material tube 2 is a cylinder, and the positioning portion 211 is correspondingly formed with a curved face.

Figure 6:
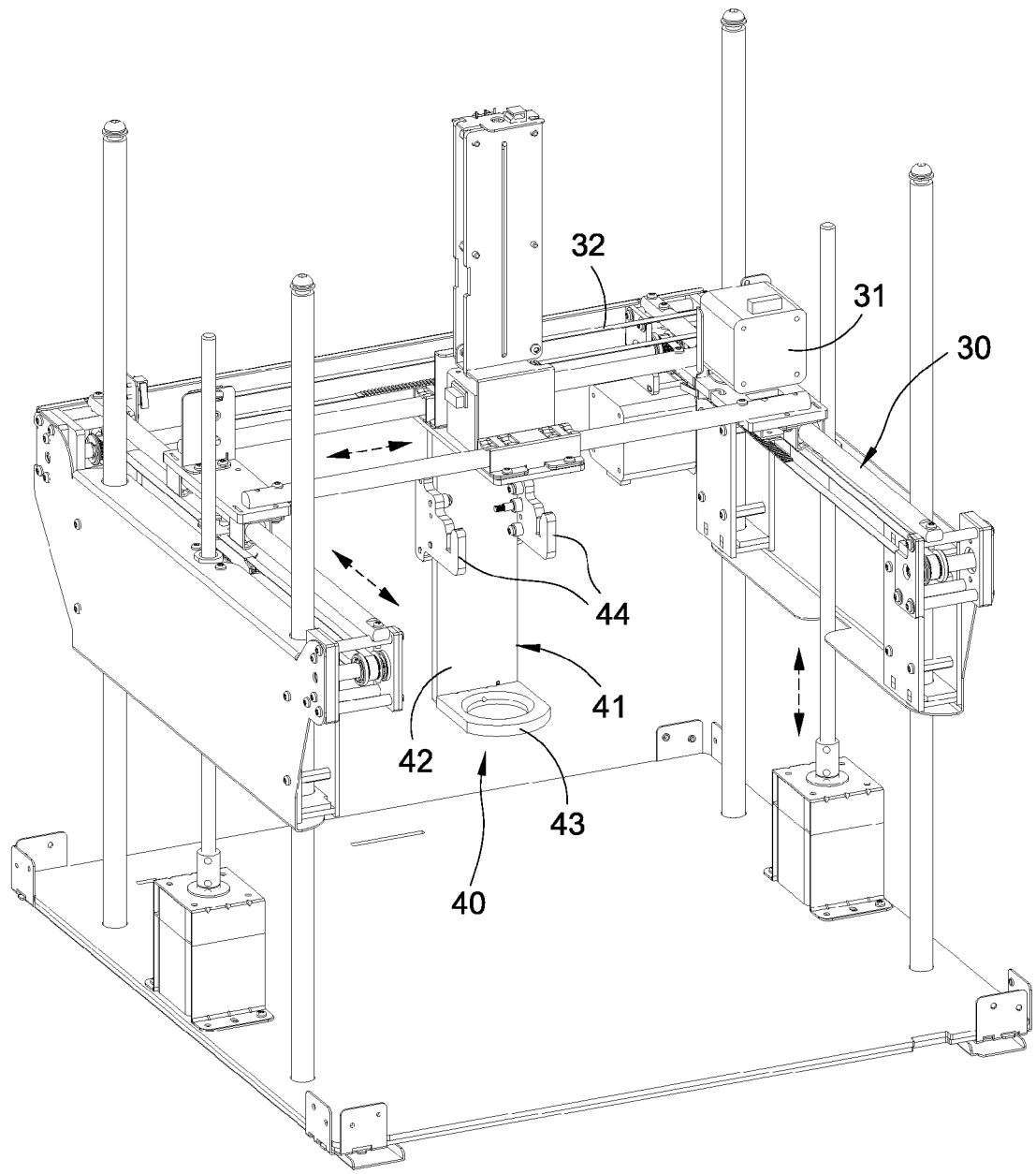
FIG. 6 is an operation view of a driving module of the 3D printer according to the disclosed example.

Please refer to FIGS. 6 to 9 which are an operation view of a driving module according to the disclosed example, a schematic view thereof illustrating the movement of a printing module to the material rack, a schematic view illustrating a fetching and laying operation in relation to the material rack, and a schematic view illustrating the movement of the printing module to a print zone, respectively. Referring to FIG. 6, the printing module 40 includes a loading base 41 driven by the driving module 30. The loading base 41 includes a supporting stand 42 supporting the material tube 2 and a positioning ring 43 for insertion of the material tube 2. The positioning ring 43 is located on the bottom of the supporting stand 42. Moreover, the driving module 30 drives the printing module 40 to move along the X, Y, and Z directions inside the machine body 10.

Figure 7:
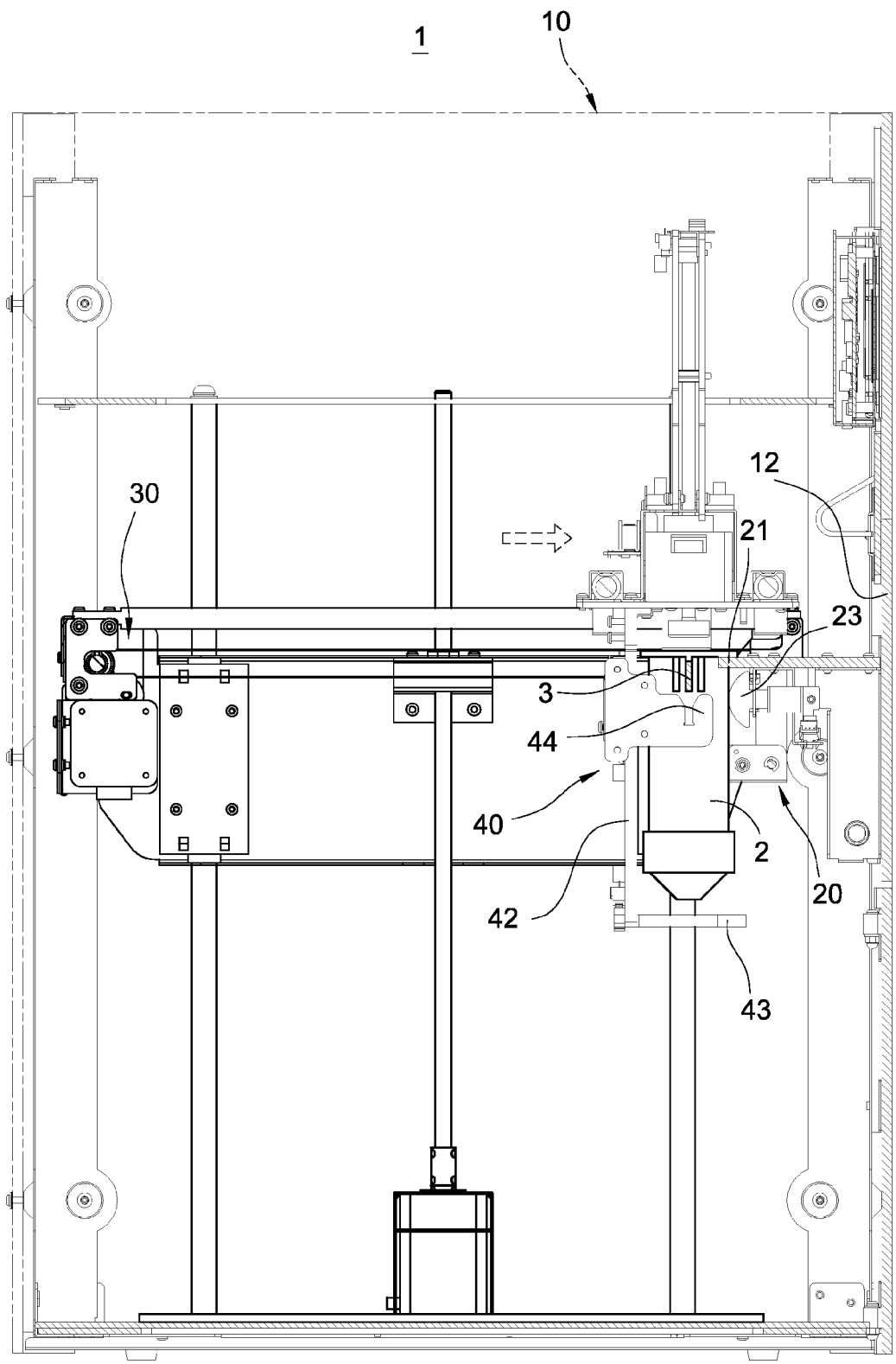
FIG. 7 is a schematic view illustrating the movement of a printing module to the material rack of the 3D printer according to the disclosed example.
Figure 8:
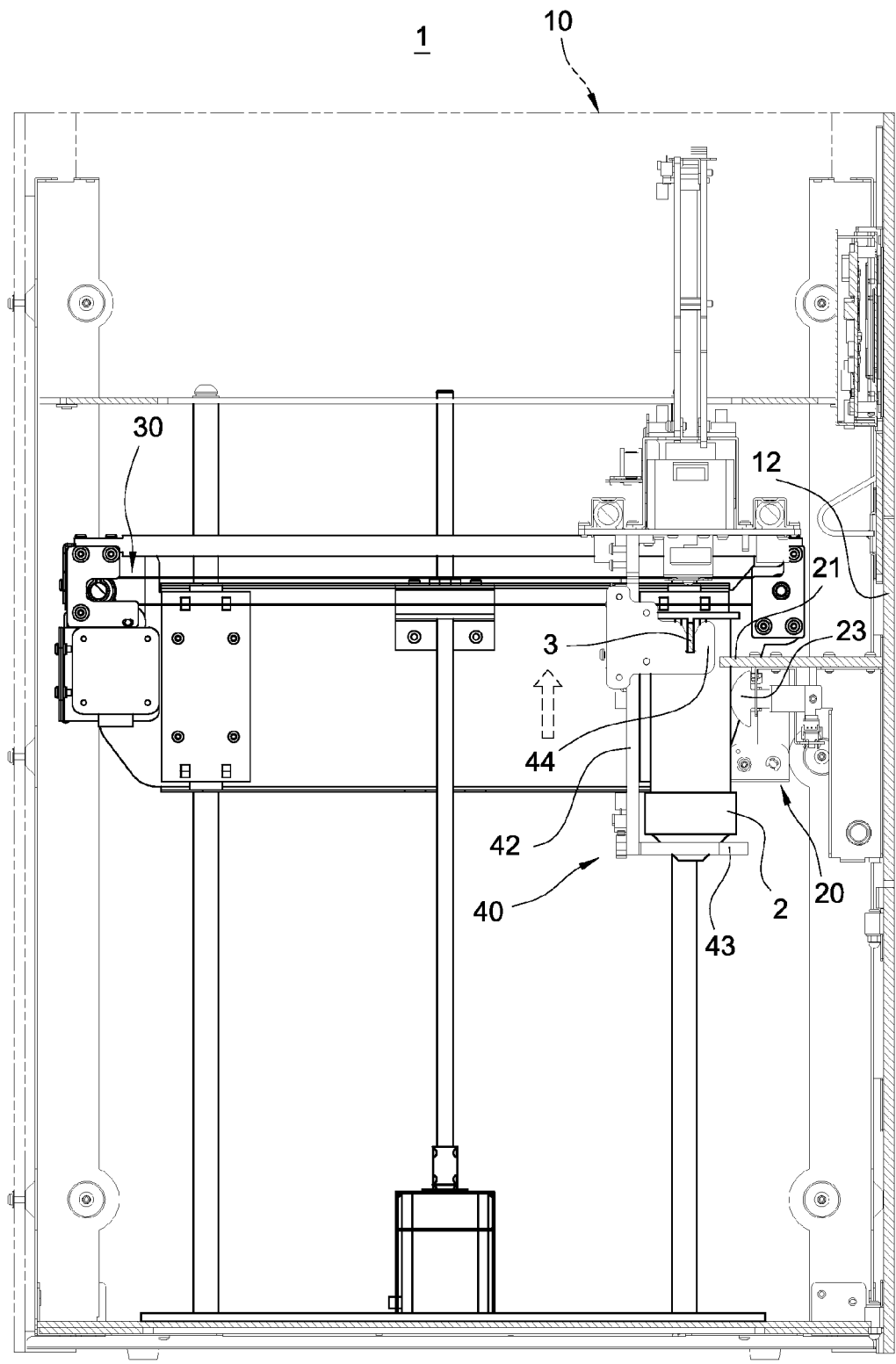
FIG. 8 is a schematic view illustrating a fetching and laying operation in relation to the material rack of the 3D printer of the disclosed example.
Figure 9:
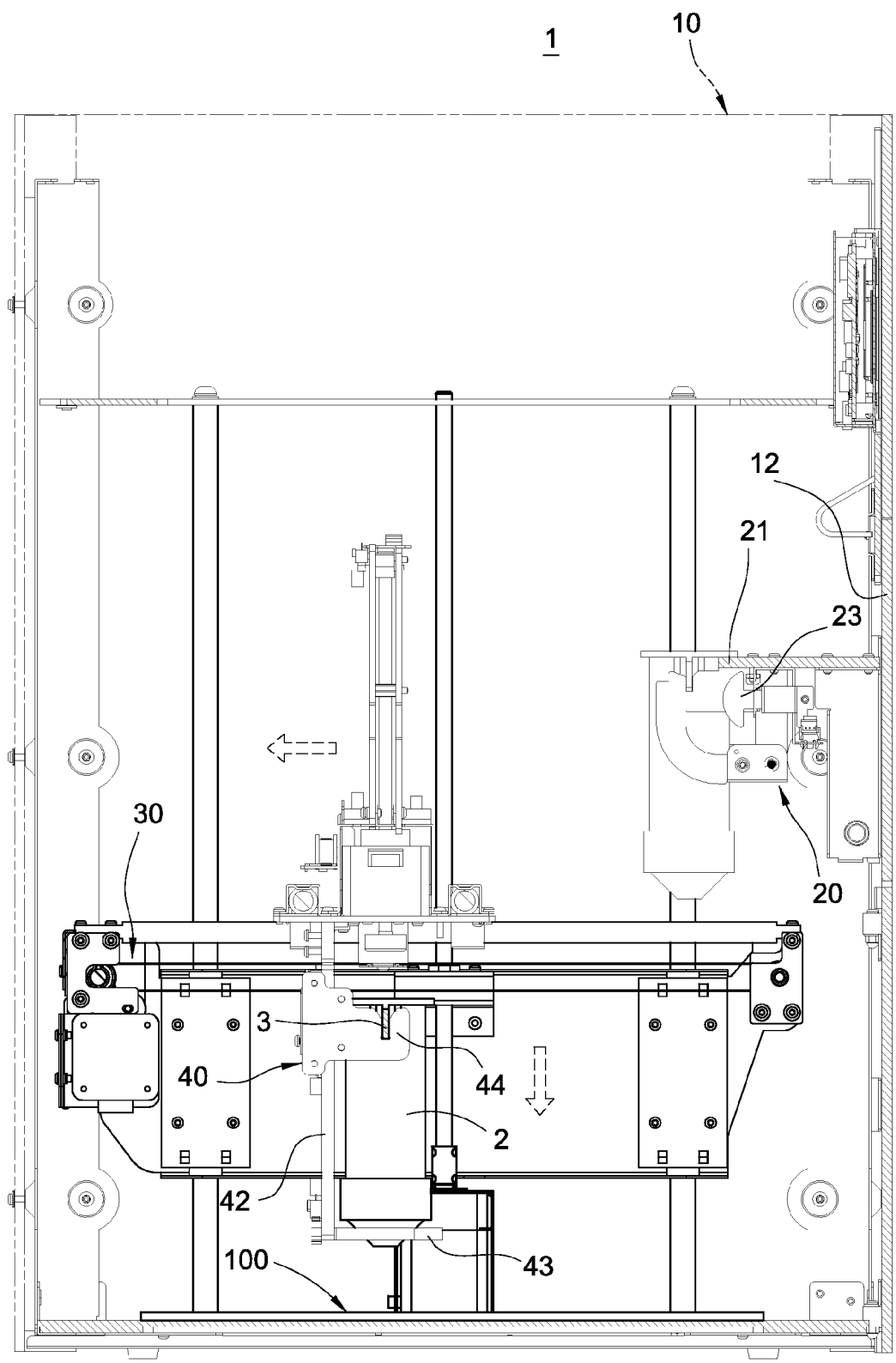
FIG. 9 is a schematic view illustrating the movement of the printing module to a print zone of the 3D printer according to the disclosed example.

Referring to FIGS. 7 to 9, to change the material tube 2 of the 3D printer 1, the driving module 30 drives the printing module 40 to move toward the door sheet 12 and stop at the material rack 20. According to the present embodiment, the material tube 2 includes a pair of wings 3. Furthermore, the supporting stand 42 includes a pair of hook arms 44. The material tube 2 is moved to the supporting stand 42 by engaging of the hook arms 44 with the pair of the wings 3.

Referring to FIG. 7, to change the material tube 2 of the 3D printer 1, first the printing module 40 is moved to a position slightly lower than the material tube 2. Then, the driving module 30 drives the printing module 40 to move up. At this time, the pair of the hook arms 44 engages the wings 3 of the material tube 2. As shown in FIG. 8, the wings 3 of the material tube 2 are positioned on the pair of the hook arms 44. On the other hand, a material outlet of the material tube 2 is inserted out of the positioning ring 43. Accordingly, the material tube 2 is driven by the printing module 40 to move out of the material receiving compartment 121 and be positioned on the printing module 40. Referring to FIG. 9, finally the driving module 30 drives the printing module 40 to move back to the printing zone 100, so perform next printing operation.

Figure 10:
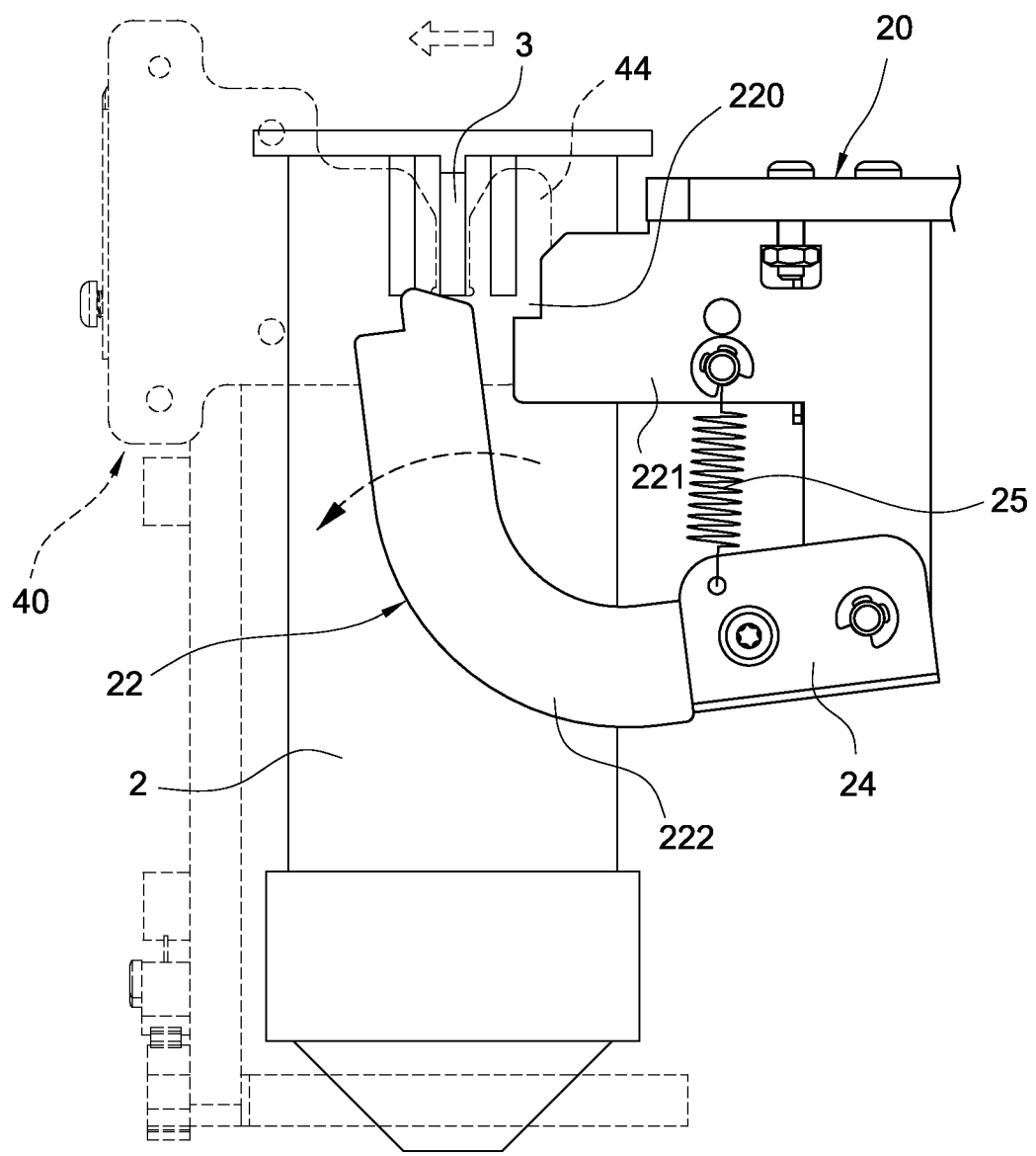
FIG. 10 is a schematic view showing moving of the material tube out of a material receiving compartment of the 3D printer according to the disclosed example.

Please refer to FIG. 10 which is a schematic view showing moving of the material tube out of a material receiving compartment of the 3D printer according to the disclosed example. It should be noted that, the material rack 20 of the example embodiment includes a plurality of pivot bases 24 and a plurality of springs 25 disposed corresponding to the partition members 22. Each of the partition members 22 includes a supporting member 221 and an extension arm 222 in contact against the supporting member 221. The extension arm 222 is movably coupled to the supporting member 221 through the pivot base 24. The spring 25 is resiliently connected between the supporting member 221 and the extension arm 222 for enabling a resilient contact between the supporting member 221 and the extension arm 222. According to the present embodiment, two ends of the spring 25 are connected to the supporting member 221 and the pivot base 24 which is pivotally connected to the extension arm 222, respectively.

Moreover, when the extension arm 222 rotates with respect to the supporting member 221, the positioning recess 220 is exposed. At this time, the hook arm 44 of the printing module 40 can move at the same horizontal level as the position of the wing 3 of the material tube 2, and can move the material tube 2 out of the material receiving compartment 121, thereby preventing the extension arm 222 from being damaged by the impact of the material tube 2 during the moving of the material tube 2 out of the material receiving compartment 121.

Figure 11:
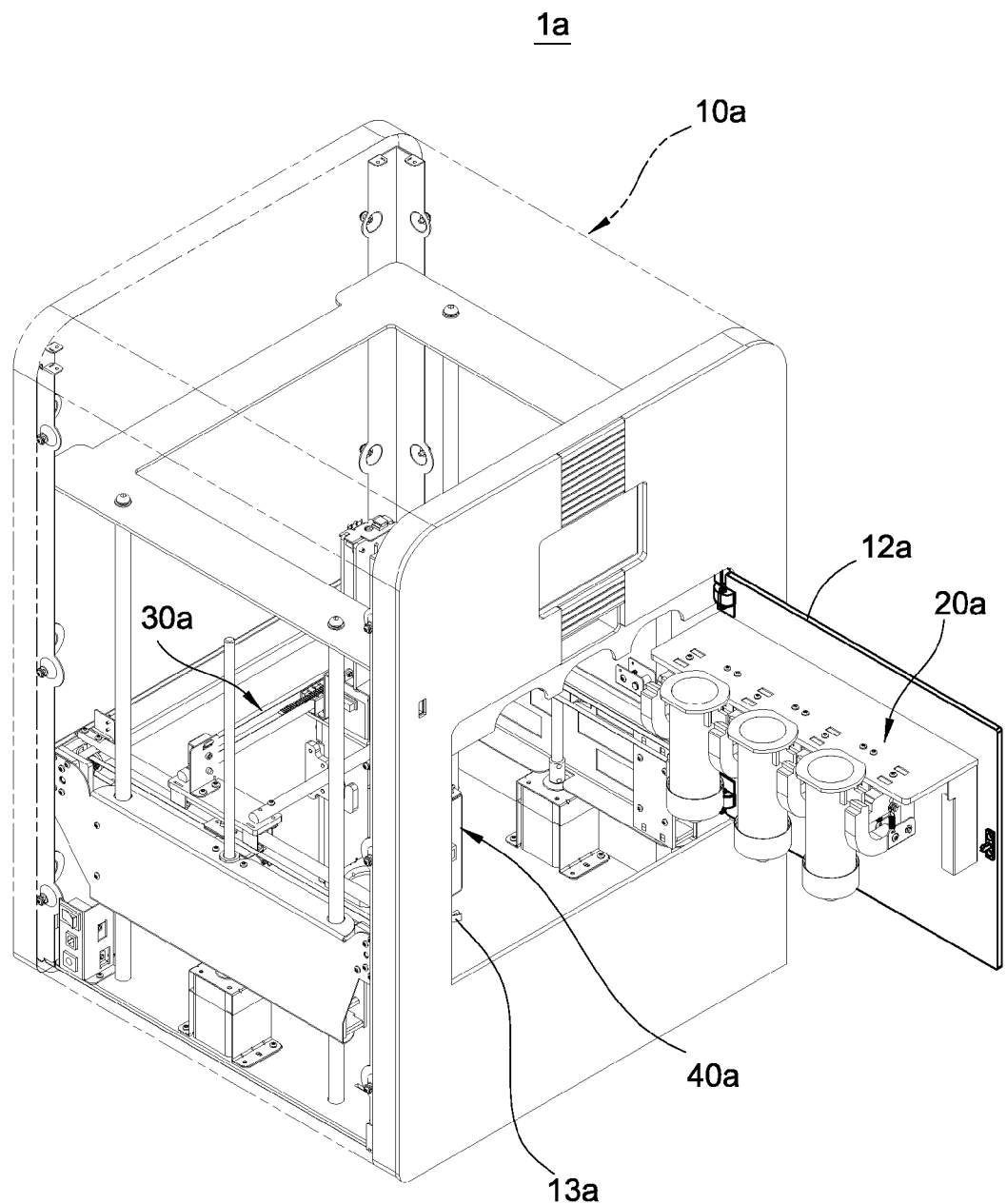
FIG. 11 is a schematic view of the material rack of the 3D printer according to another embodiment of the disclosed example.

Please refer to FIG. 11 which is a schematic view of a material rack according to another embodiment of the disclosed example. As shown in FIG. 11, a 3D printer 1a includes a machine body 10a, a door sheet 12a, a material rack 20a, a driving module 30a, and a printing module 40a. The door sheet 12a is movably connected to the machine body 10a. The material rack 20a, the driving module 30a, and the material rack 20a are all disposed inside the machine body 10a.

Different from the previously mentioned embodiment, in the present embodiment, the door sheet 12a opens and closes in the left-right direction with respect to the machine body 10a. Similarly, the machine body 10a includes a first sensor 13a. The first sensor 13a is actuated by closing the door sheet 12a to cover the machine body 10a. By disposing the first sensor 13a, the 3D printer 1a determines whether the door sheet 12a is closed properly, so as to ensure a safety and proper printing operation.

It is to be understood that the above descriptions are merely preferable embodiment of the disclosed example and not intended to limit the scope of the disclosed example. Equivalent changes and modifications made in the spirit of the disclosed example are regarded as falling within the scope of the disclosed example.

What is claimed is:

1. A 3D printer (1, 1*a*) comprising:
   a machine body (10, 10*a*);
   a door sheet (12, 12*a*) movably connected to the machine body (10, 10*a*);
   a material rack (20, 20*a*) fixed to the door sheet (12, 12*a*) and disposed in an inner area (120) toward an inside of the machine body (10, 10*a*), the material rack (20, 20*a*) including a positioning plate (21) and a plurality of partition members (22), the partition members (22) dividing the inner area (120) into a plurality of material receiving compartments (121);
   at least one material tube (2), the material tube (2) including a pair of wings (3), each of the partition members (22) including a positioning recess (220) correspondingly, the material tube (2) being positioned in the material receiving compartment (121) by disposing of the pair of the wings (3) in a spanning manner on the positioning recesses (220) of two adjacent partition members (22);
   a driving module (30, 30*a*) disposed inside the machine body (10, 10*a*); and
   a printing module (40, 40*a*) disposed inside the machine body (10, 10*a*) and driven by the driving module (30, 30*a*) to move to the material receiving compartment (121), the material tube (2) is driven by the printing module (40, 40*a*) to move out of the material receiving compartment (121) and be positioned on the printing module (40, 40*a*).

2. The 3D printer (1, 1*a*) of claim 1, wherein the positioning plate (21) is disposed perpendicularly on the door sheet (12, 12*a*), and the partition members (22) are arranged equidistantly and parallelly on one side of the positioning plate (21).

3. The 3D printer (1, 1*a*) of claim 1, wherein the printing module (40, 40*a*) includes a loading base (41) driven by the driving module (30, 30*a*), the loading base (41) includes a supporting stand (42) supporting the material tube (2) and a positioning ring (43) for insertion of the material tube (2), and the positioning ring (43) is located on the bottom of the supporting stand (42).

4. The 3D printer (1, 1*a*) of claim 3, wherein the supporting stand (42) includes a pair of hook arms (44), and the material tube (2) is moved to the supporting stand (42) by engaging of the hook arms (44) with the pair of the wings (3).

5. The 3D printer (1, 1*a*) of claim 1, wherein the positioning plate (21) includes a positioning portion (211), and a peripheral surface of the material tube (2) is in contact against the positioning portion (211).

6. The 3D printer (1, 1*a*) of claim 5, wherein the material tube (2) is a cylinder, and the positioning portion (211) is correspondingly formed with a curved face.

7. The 3D printer (1, 1*a*) of claim 1, wherein the door sheet (12, 12*a*) opens and closes in the up-down direction with respect to the machine body (10, 10*a*), and the door sheet (12, 12*a*) is opened in an inclination angle with respect to the machine body (10, 10*a*).

8. The 3D printer (1, 1*a*) of claim 7, wherein the machine body (10, 10*a*) includes a first sensor (13, 13*a*), the first sensor (13, 13*a*) is actuated by closing the door sheet (12, 12*a*) to cover the machine body (10, 10*a*).

9. The 3D printer (1, 1*a*) of claim 1, wherein the door sheet (12, 12*a*) opens and closes in the right-left direction with respect to the machine body (10, 10*a*).

10. The 3D printer (1, 1*a*) of claim 9, wherein the machine body (10, 10*a*) includes a first sensor (13, 13*a*), and the first sensor (13, 13*a*) is actuated by closing the door sheet (12, 12*a*) to cover the machine body (10, 10*a*).

11. The 3D printer (1, 1*a*) of claim 1, wherein the material rack (20, 20*a*) further includes a plurality of pivot bases (24) and a plurality of springs (25) disposed corresponding to the partition members (22), each of the partition members (22) includes a supporting member (221) and an extension arm (222) in contact against the supporting member (221), the extension arm (222) is movably coupled to the supporting member (221) through the pivot base (24), and the spring (25) is resiliently connected between the supporting member (221) and the extension arm (222).

12. The 3D printer (1, 1*a*) of claim 1, wherein each of the material receiving compartments (121) includes a second sensor (23) pressable by the material tube (2).

* * * * *